US012057284B2

(12) United States Patent
Wu et al.

(10) Patent No.: US 12,057,284 B2
(45) Date of Patent: Aug. 6, 2024

(54) SWITCH DEVICE STRUCTURE

(71) Applicants: SWITCHLAB INC., New Taipei (TW); SWITCHLAB (SHANGHAI) CO., LTD., Shanghai (CN); GAOCHENG ELECTRONICS CO., LTD., Shenzhen (CN)

(72) Inventors: Chih-Yuan Wu, New Taipei (TW); Chih Kun Hsiao, New Taipei (TW)

(73) Assignees: SWITCHLAB INC., New Taipei (TW); Switchlab (Shanghai) Co., Ltd., Shanghai (CN); GAOCHENG ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/980,124

(22) Filed: Nov. 3, 2022

(65) Prior Publication Data

US 2023/0136132 A1 May 4, 2023

(30) Foreign Application Priority Data

Nov. 3, 2021 (TW) ................................ 110212962

(51) Int. Cl.

*H01H 9/02* (2006.01)
*H01H 1/24* (2006.01)
*H01H 3/08* (2006.01)
*H01H 3/12* (2006.01)

(52) U.S. Cl.

CPC ................ *H01H 9/02* (2013.01); *H01H 1/24* (2013.01); *H01H 3/08* (2013.01); *H01H 3/12* (2013.01); *H01H 2205/004* (2013.01); *H01H 2221/044* (2013.01); *H01H 2225/01* (2013.01); *H01H 2225/012* (2013.01); *H01H 2225/014* (2013.01)

(58) Field of Classification Search

CPC ......... H01H 2205/00; H01H 2205/004; H01H 2221/00; H01H 2221/04; H01H 2221/044; H01H 2225/00; H01H 2225/01; H01H 2225/012; H01H 2225/014; H01H 9/00; H01H 9/02; H01H 1/00; H01H 1/24; H01H 3/00; H01H 3/08; H01H 3/12

USPC .......................................................... 200/5 R

See application file for complete search history.

(56) References Cited

U.S. PATENT DOCUMENTS 6,399,908 B1 * 6/2002 Mueller .................. H01H 5/18
200/332

* cited by examiner

*Primary Examiner* — Anthony R Jimenez
(74) *Attorney, Agent, or Firm* — Rosenberg, Klein & Lee

(57) ABSTRACT

A switch device structure includes an assembly of a main body and an operation body. An electrical connection module and an elastic unit are mounted on the main body. The contact arm of the electrical connection module has a first member and/or a second member with variable arrangement position. According to the position or motion of the operation body, the elastic unit provides an elastic force to push the contact arm of the electrical connection module into a contacting circuit closed state or make the elastic unit separate from the contact arm to form a circuit open state. The arrangement form of the first member and/or the second member of the contact arm of the electrical connection module is variable in accordance with the specification of the switch to achieve NO mode and NC mode.

42 Claims, 8 Drawing Sheets

SWITCH DEVICE STRUCTURE

BACKGROUND OF THE INVENTION

1. Field of the Invention

The present invention relates generally to a switch device structure, and more particularly to a switch device including an assembly of a main body and an operation body. A movable contact arm is mounted on the main body. The movable contact arm includes a first member and a second member. The operation body is equipped with an elastic unit. Accordingly, the arrangement form of the second member is variable to achieve NO mode and NC mode and ensure that the circuit is closed and/or open.

2. Description of the Related Art

A conventional switch device is applied to an electrical, an electronic or an automatic control system for an operator to operate the machine to work or make the circuit situated in a normally open (NO) or a normally closed (NC) state.

Such switch device also can serve as an emergency switch. In the case that an operator improperly operates the machine or the equipment fails or the like, the operator can emergently open the circuit to power off the system so as to avoid serious damage or loss.

The conventional emergency switch device generally includes an operation button equipped with a pushbutton and/or rotary switch and a case body for receiving the operation button and the spring. A connection seat (or base seat) and an electrical connection module with a contact arm are assembled in the case body. When an operator presses the operation button to drive and press down the connection seat, the case body relatively forces the connection seat to compress the spring. The spring pushes out the connection seat to locate the same, whereby the connection seat can push and press the electrical connection module to open the circuit.

In practice, the operator can rotate or forcedly pull up the operation button and the connection seat to make the connection seat restore to its home assembled position or the close-circuit state of the electrical connection module. Conventional switch devices disclose an embodiment, in which a coiled spring is disposed between the switch case body and the slide body in cooperation with a first leaf spring and a second leaf spring of the electrical connection module. When an operator pulls up or presses the operation button, the first and second leaf springs elastically contact the fixed contact to close the circuit or separate from the fixed contact to open the circuit.

With respect to the structure, practical operation and application of the conventional switch device, some shortcomings exist in the conventional switch device as follows:

1. In some operation and application situations, multiple electrical connection modules are arranged in the switch device, which are respectively situated in NO and/or NC circuit (or mode). In order to meet the requirements of the NO circuit and NC circuit, the movable contact arms of the electrical connection modules often have different structural forms. As well known by those who are skilled in this field, this will increase the manufacturing cost and assembling trouble of the manufacturers. In other words, the movable contact arms with single same structure cannot be mounted to achieve the NO and/or NC circuit at the same time.
2. In the case that the switch device serves as an emergency switch, when an operator urgently cuts off the power or open the circuit, the operator often instinctively overforces the operation button or the pushbutton to forcedly situate the first leaf spring and/or the second leaf spring in an open (or contact) state.

It should be noted that in the conventional switch device, the elasticity of the first leaf spring and the second leaf spring is used in cooperation with the rigid structure of the push member to achieve the NO or NC mode. In the case of long-term (or highly frequent) use or due to human factors, the material fatigue of the first and second leaf springs is apt to take place or the lifetimes of the first and second leaf springs are often shortened. This is not what we expect.

To speak representatively, the conventional switch devices reveal some shortcomings of the operation body, the electrical connection module and the relevant connection components of the conventional switch device in use and structural design. In the case that the assembling structures and the application of the switch device, the electrical connection module and the relevant components are redesigned to be different from the conventional switch device, the use form of the switch device can be changed to enhance the application effect thereof. For example, in the condition that the structure is simplified and the operation is facilitated, the redesign should include the following issues:

1. The electrical connection module has a movable contact arm with one single structural form. In addition, the mounting system of the movable contact arm can be changed so as to achieve the NO and/or NC modes at the same time. This improves the shortcoming of the conventional switch device that the manufacturing cost and the assembling trouble are higher.
2. A new elastic unit structure is provided to provide a motional distance and elastic force to help the movable contact arm in contacting the fixed contact arm of the electrical connection module. This improves the shortcoming of the conventional switch device that elastic fatigue of the conventional structure is apt to take place and the lifetime of the conventional structure is often shortened.

SUMMARY OF THE INVENTION

It is therefore a primary object of the present invention to provide a switch device structure includes an assembly of a main body and an operation body. An electrical connection module and an elastic unit are mounted on the main body. The (movable) contact arm of the electrical connection module has a first member and/or a second member with variable arrangement position. The elastic unit is disposed on the operation body. The elastic unit includes a fixed section, a free section and a bent section connected between the fixed section and the free section, which together define a geometrical configuration. (The bent section at least includes a bent section and a subsidiary bent section). According to (or in response to) the position or motion of the operation body, the elastic unit provides an elastic force to push the contact arm of the electrical connection module into a contacting circuit closed state or make the elastic unit separate from the contact arm to form a circuit open state. The arrangement form of the first member and/or the second member of the contact arm of the electrical connection module is variable in accordance with the specification of the switch to achieve NO mode and NC mode.

In the above switch device structure, the contact arms of the electrical connection module are classified into a fixed contact arm and a movable contact arm. The first member of the movable contact arm is formed with a connection section. The second member of the movable contact arm includes a base section and a subsidiary connection section directed to outer side. The subsidiary connection section is assembled with the connection section of the first member. Alternatively, after the second member (and/or the elastic unit) is 180-degree turned, the subsidiary connection section is assembled with the connection section of the first member. Accordingly, the arrangement form of the movable contact arm is variable to achieve NO mode and NC mode.

In the above switch device structure, the fixed section of the elastic unit is fixed on the operation body, whereby the elastic unit moves in response to the motion of the operation body. The elastic unit includes a base section windingly extending from the fixed section, a bent section connected with the base section and a (concaved) bow section connected with the bent section. In addition, a tail end of the bow section is formed with a subsidiary bent section and a free section connected with the subsidiary bent section. The free section extends in a direction to the fixed section to together define a geometrical configuration. When the elastic unit moves according to (or in response to) the position or motion of the operation body, the elastic unit provides a displacement (motional) distance and elastic force.

The present invention can be best understood through the following description and accompanying drawings, wherein:

DETAILED DESCRIPTION OF THE PREFERRED EMBODIMENTS

Figure 1:
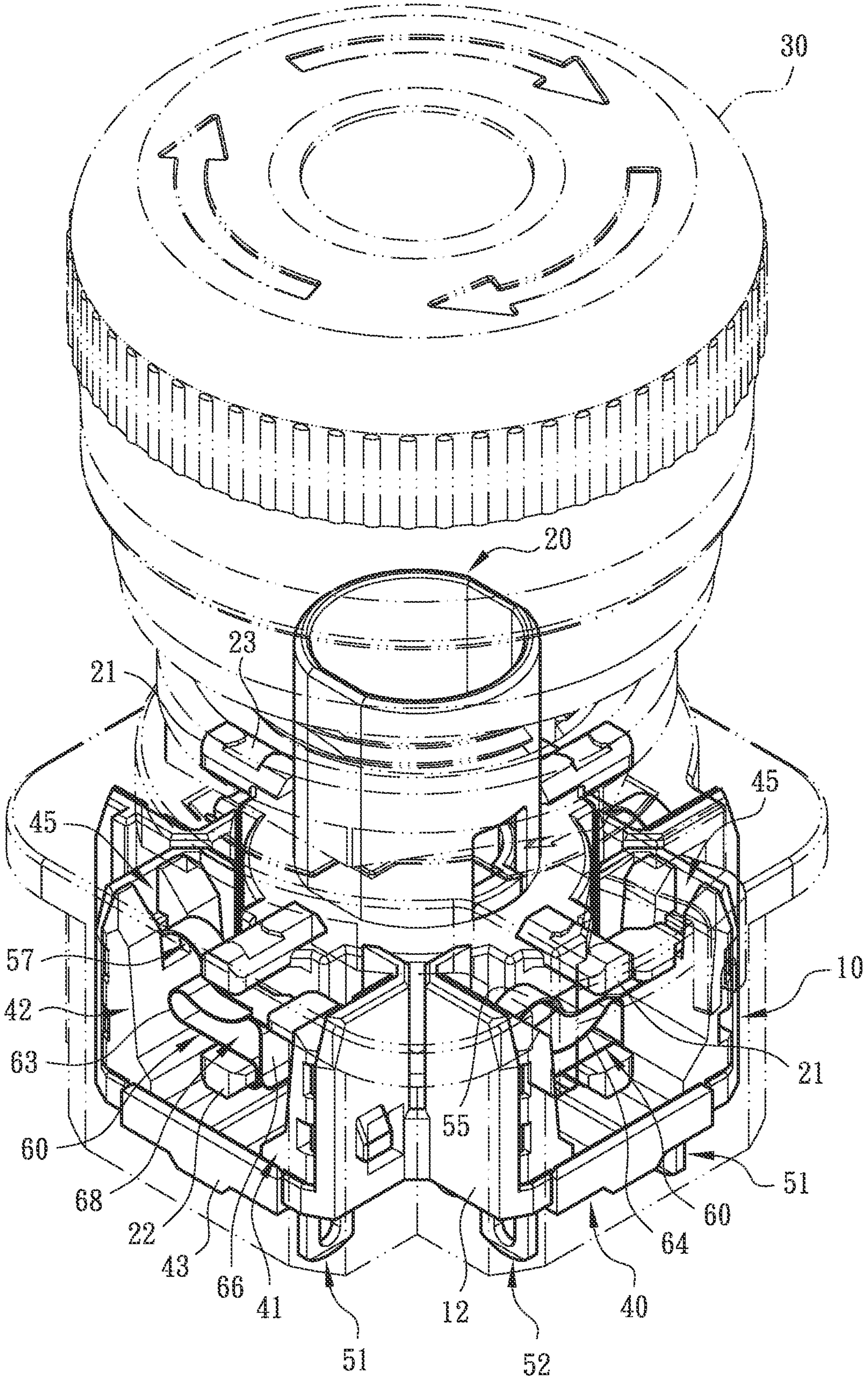
FIG. 1 is a perspective assembled view of the present invention, showing the structures of the main body, the operation body, the electrical connection module, the elastic unit and the operation button, which are assembled with each other.
Figure 2:
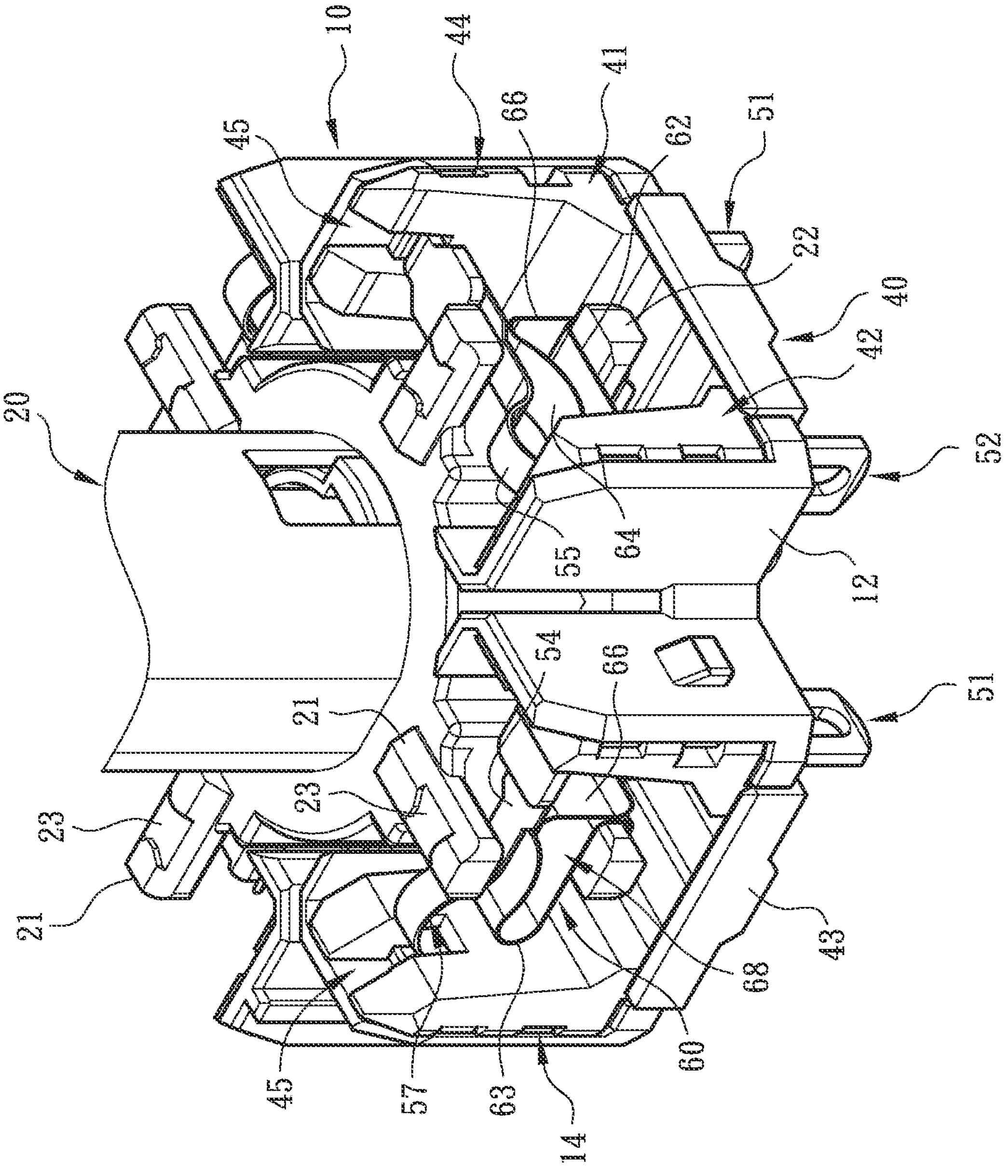
FIG. 2 is a perspective view of a part of FIG. 1, showing the structures of the main body, the operation body, the electrical connection module and the elastic unit, which are assembled with each other
Figure 3:
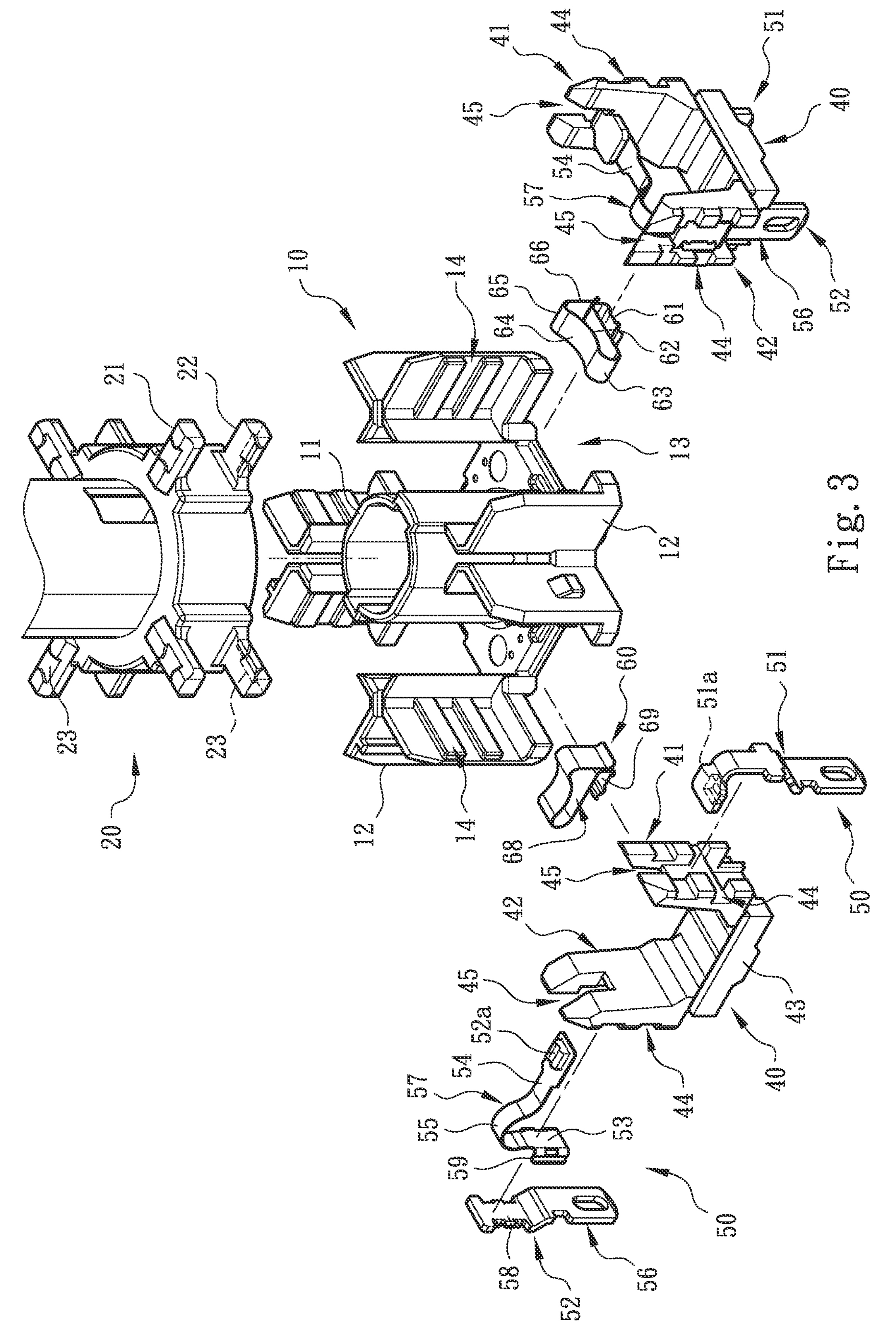
FIG. 3 is a perspective exploded view according to FIG. 2, showing the structures of the main body, the operation body, the electrical connection module and the elastic unit.

Please refer to FIGS. 1, 2 and 3. The switch device structure of the present invention includes an assembly of a main body 10 and an operation body 20 of the switch device. An operation button 30 is pivotally disposed on the main body 10 and/or the operation body 20. The operation button 30 is permitted to rotate and/or reciprocally move in an axial direction of the switch to drive the operation body 20 to move.

It should be noted that the switch device has such a specification and arrangement that the switch device is situated in an NO and/or NC mode. The relevant cooperative structures for the operation button 30 to drive the operation body 20 to move pertain to prior art and thus will not be specifically described hereinafter.

The upper section, lower section, outer section, inner section, front end, rear end, etc. mentioned hereinafter are recited with the direction of the drawings as the reference direction.

As shown in the drawings, the main body 10 has a protruding base body 11 and multiple stands 12 positioned around the base body 11. The base body 11 is assembled with the operation body 20, whereby the operation body 20 is permitted to reciprocally move on the base body 11 in response to the rotation and/or pressing of the operation button 30.

In this embodiment, the operation body 20 has the form of a shaft-shaped body structure and is fitted on the base body 11. (At least one or multiple) upper protrusion sections 21 and lower protrusion sections 22 are disposed on the operation body 20. The upper protrusion sections 21 and the lower protrusion sections 22 (perpendicularly) protrude from the shaft-shaped body structure of the operation body 20. The upper protrusion sections 21 and/or the lower protrusion sections 22 are formed with retaining sections 23 in the form of a recessed structure.

FIGS. 2 and 3 also show that the stands 12 of the main body 10 define therebetween a space 13. Locating sections 14 are disposed on the stands 12 in the form of raised/recessed structures for mounting a rest section 40 and an electrical connection module 50.

In this embodiment, the main body 10 has four stands 12 and four spaces 13 in adaptation to the rest sections 40. Accordingly, the switch device can achieve an NO mode and an NC mode or two NO modes and two NC modes.

As shown in the drawings, the rest section 40 is in the form of a U-shaped structure having a first section 41, a second section 42 and a base section 43 connected between the first and second sections 41, 42. The first and second sections 41, 42 are respectively formed with subsidiary locating sections 44 in the form of raised/recessed structures and notches 45 positioned at a head end of the first section 41 and a head end of the second section 42. The subsidiary locating sections 44 of the rest section 40 are assembled with the locating sections 14 of the stands 12 to help in securely mounting the electrical connection module 50 on the rest section 40.

Figure 4:
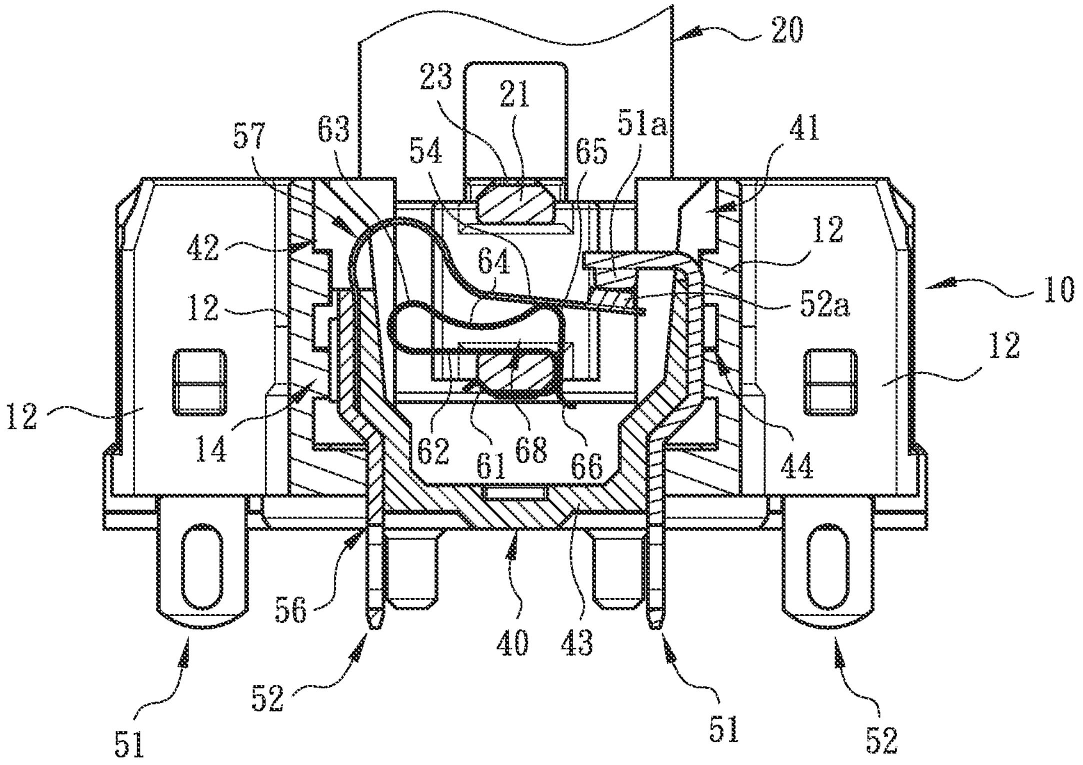
FIG. 4 is a plane view according to FIG. 2, showing the structures of the main body, the operation body, the electrical connection module and the elastic unit, which cooperate with each other to achieve an NC mode.

Please refer to FIGS. 3 and 4. The electrical connection module 50 includes multiple contact arms. The arrangement position of at least one of the contact arms of the electrical connection module 50 is variable. The contact arms are classified into a fixed contact arm 51 assembled with the first section 41 and a movable contact arm 52 assembled with the second section 42. Alternatively, the fixed contact arm 51 is mounted in a position between the stand 12 and the first section 41, while the movable contact arm 52 is mounted in a position between the stand 12 and the second section 42. The fixed contact arm 51 has a fixed contact 51*a*. The fixed contact 51*a* extends through the notch 45 of the first section 41 into the space 13 of the rest section 40 or the stand 12.

In this embodiment, the movable contact arm 52 is a two-piece structure including a first member 56 and a second member 57. The first member 56 has a head section formed with a connection section 58. The second member 57 has a free section 54 and a movable contact 52*a* disposed on the free section 54. The free section 54 and the movable contact 52*a* pass over the notch 45 of the second section 42 into the space 13 of the rest section 40 or the stand 12. The movable contact 52*a* extends to the position of the fixed contact 51*a*, whereby the fixed contact 51*a* and the movable contact 52*a* are positioned in an upper position and a lower position as shown in FIG. 4.

As shown in the drawings, the second member 57 of the movable contact arm 52 is formed with a bent section 55 connected with the free section 54. The bent section 55 serves to enhance the elasticity and/or motional range of the free section 54. In addition, the second member 57 has a base section 53 connected with the bent section 55. The base section 53 is formed with a subsidiary connection section 59 directed to outer side of the stand 12 (or FIG. 4). The subsidiary connection section 59 holds and is assembled with the connection section 58 of the first member 56 and/or the second member 57 is 180-degree turned to assemble the subsidiary connection section 59 with the connection section 58 of the first member 56. Accordingly, the arrangement form of the second member 57 is variable to achieve NO and NC modes. (This will be further described hereinafter).

In this embodiment, the operation body 20 is equipped with an elastic unit 60, which moves in response to the position or motion of the operation body 20. The elastic unit 60 includes a fixed section 61, a free section 66 and a bent section connected between the fixed section 61 and the free section 66, which together define a geometrical configuration.

To speak more specifically, the elastic unit 60 includes a fixed section 61, a base section 62 windingly extending from the fixed section 61, a bent section 63 connected with the base section 62 and a bow section 64 connected with the bent section 63. In addition, a tail end of the bow section 64 is formed with a subsidiary bent section 65 and a free section 66 connected with the subsidiary bent section 65. The free section 66 extends in a direction to the fixed section 61 to together define a geometrical configuration. When the elastic unit 60 moves in response to the operation body 20, the elastic unit 60 provides a displacement (motional) distance and elastic force.

In this embodiment, the aforesaid bent section includes the bent section 63, the subsidiary bent section 65 and/or the bow section 64. The fixed section 61 of the elastic unit 60 is fixed on the operation body 20. The fixed section 61 is bent upward (to the upper side of the drawing) and transversely extends to form the base section 62, whereby an indentation 69 is defined between the fixed section 61 and the base section 62. The base section 62 is upward bent (to the upper side of the drawing) to form the bent section 63. The bent section 63 transversely extends to form the (concaved) bow section 64, (that is, the bow section 64 has the form of a concaved bow structure). The tail end of the bow section 64 is bent to form the (convex) subsidiary bent section 65. The subsidiary bent section 65 extends in a direction to the fixed section 61 (or to the lower side of the drawing) to form the free section 66. The length of the free section 66 passes through the horizontal position of the base section 62 to together define a geometrical configuration with a confined space 68.

FIG. 4 shows the structures of the main body 10, the operation body 20, the electrical connection module 50 and the elastic unit 60, which cooperate with each other to achieve the NC mode. The bent section 55 of the movable contact arm 52 is upward convex (in a direction to the upper side of the drawing). The fixed section 61 (and/or the indentation 69) of the elastic unit 60 is securely assembled on the lower protrusion section 22 (and/or the retaining section 23) of the operation body 20, whereby the subsidiary bent section 65 (or the bow section 64) of the elastic unit 60 is directed to the free section 54 of the movable contact arm 52.

When the operation body 20 is positioned in an initial position (or defined as a first position), the lower protrusion section 22 serves as a support point for the elastic unit 60 (or the fixed section 61 or the base section 62) and the subsidiary bent section 65 pushes and presses the movable contact 52*a* into contact with the fixed contact 51*a*, whereby the switch device is situated in an NC mode. Also, the elastic unit 60 (and/or the free section 66) is displaced in a direction to the lower side of the drawing, whereby the elastic unit 60 is situated in an energy storage state.

Figure 5:
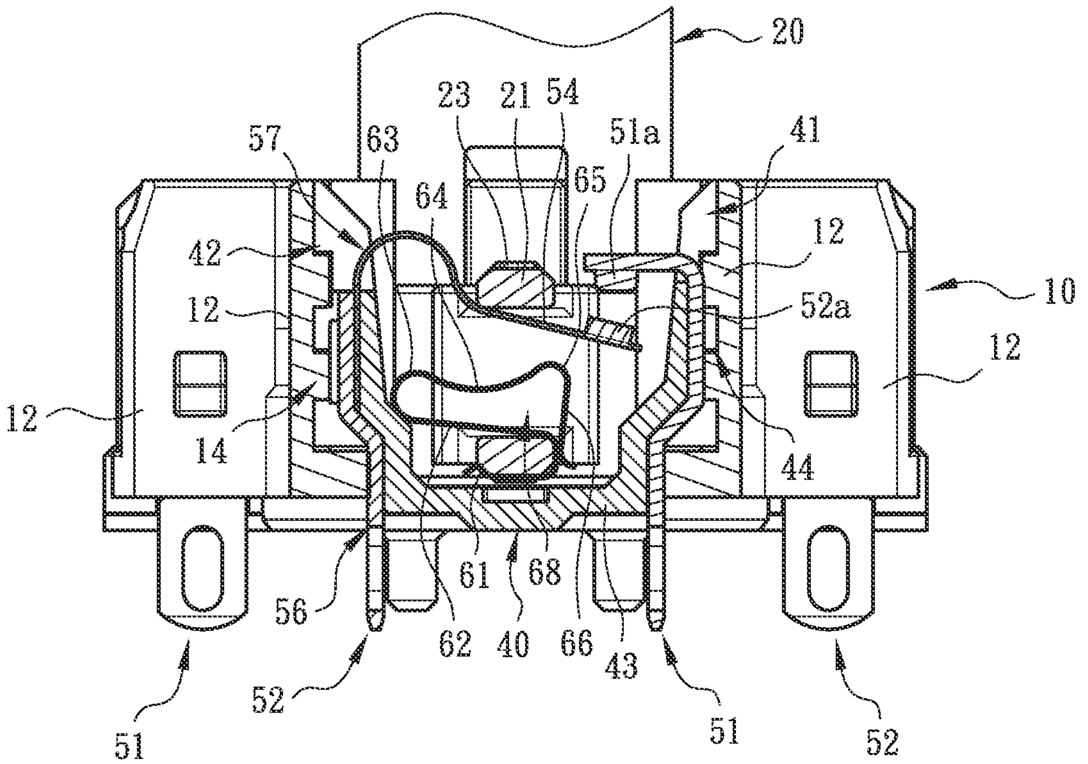
FIG. 5 is a plane view according to FIG. 4, showing that the operation body is operated to move toward the lower side.

Please refer to FIG. 5. When an operator presses down the operation button 30 due to emergency condition, the operation body 20 (and/or the lower protrusion section 22) is driven to drive the elastic unit 60 to move from the first position to the lower side of the drawing (or defined as a second position). Under such circumstance, the movable contact 52*a* is released from the push force of the subsidiary bent section 65 and the elastic unit 60 releases the stored energy so that the movable contact 52*a* separates from the fixed contact 51*a* of the fixed contact arm 51 to achieve an open circuit state.

As shown in the drawings, the upper protrusion section 21 of the operation body 20 pushes and presses the free section 54 of the movable contact arm to ensure that the movable contact 52*a* of the free section 54 separates from the fixed contact 51*a*.

Figure 6:
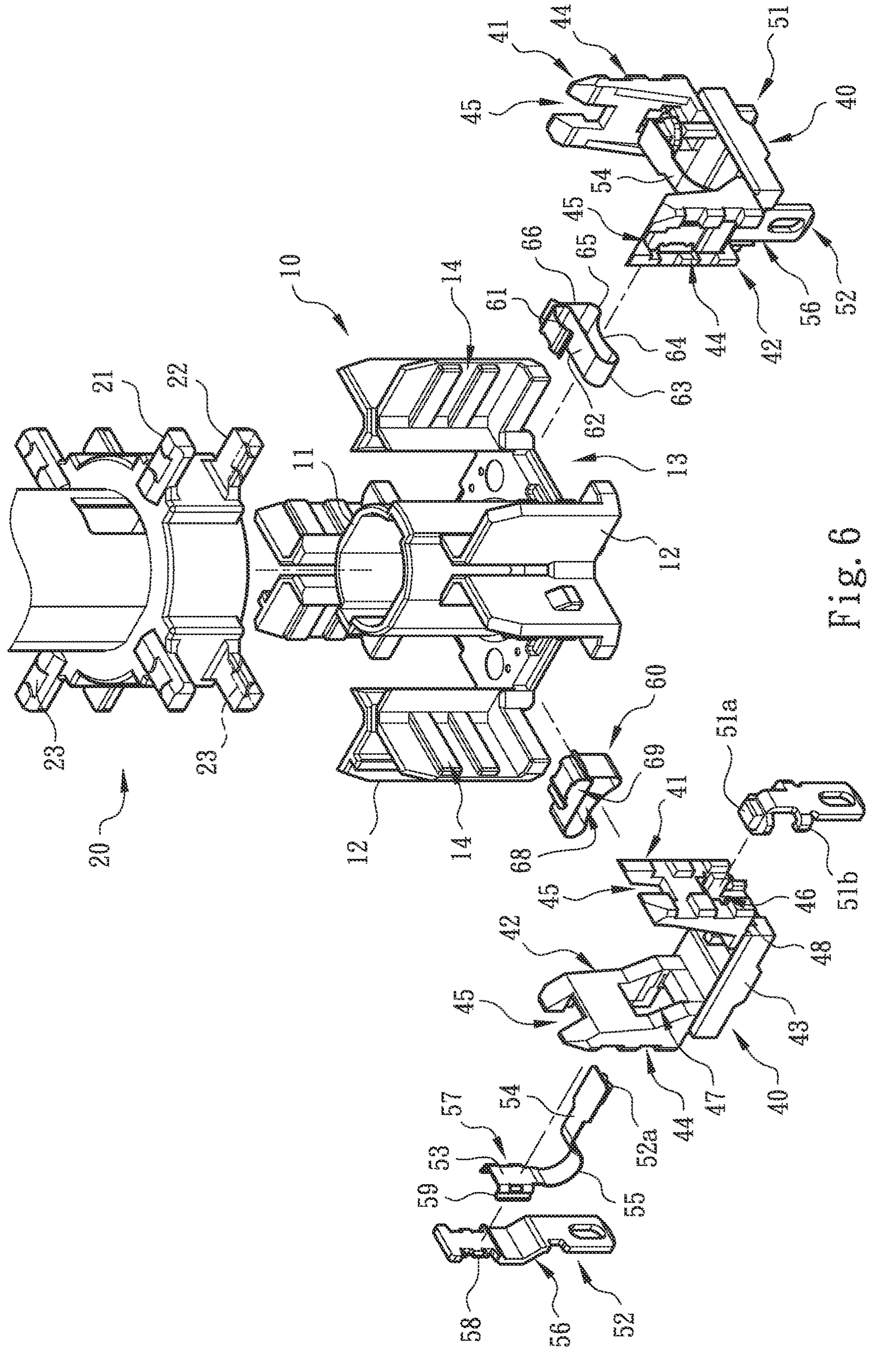
FIG. 6 is a perspective exploded view of another embodiment of the present invention, showing the structures of the main body, the operation body, the electrical connection module and the elastic unit.
Figure 7:
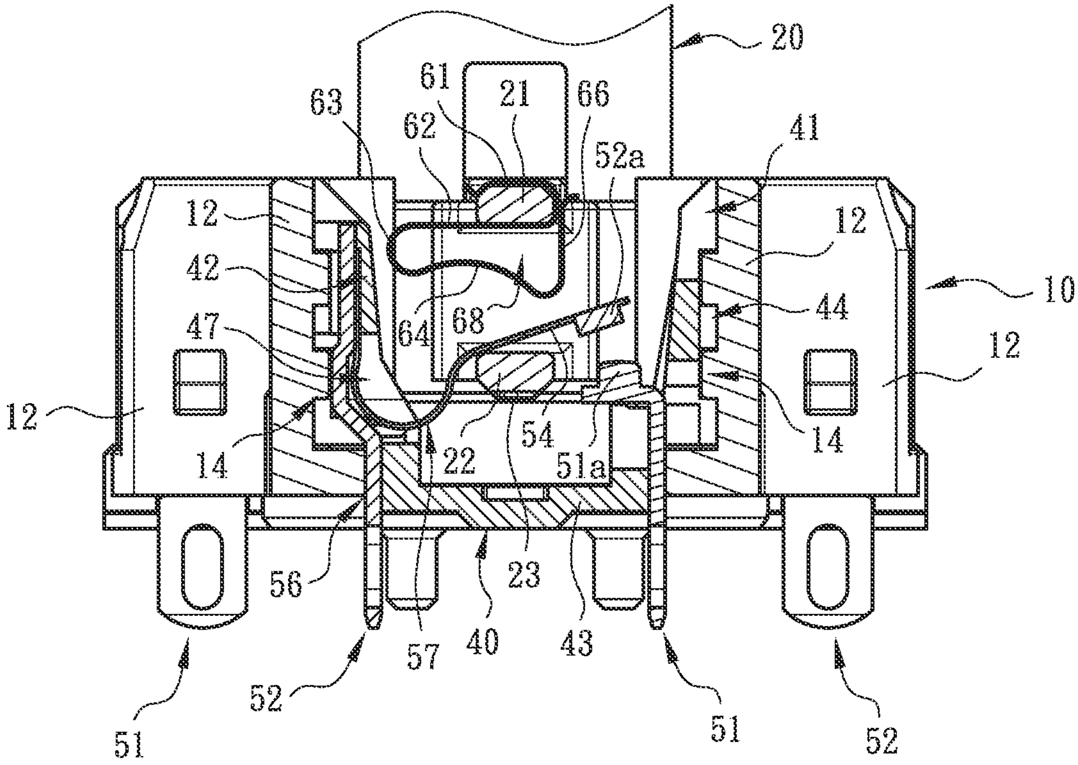
FIG. 7 is a plane assembled view according to FIG. 6, showing the structures of the main body, the operation body, the electrical connection module and the elastic unit, which cooperate with each other to achieve an NO mode.

Please now refer to FIGS. 6 and 7. FIGS. 6 and 7 show the structures of the main body 10, the operation body 20, the electrical connection module 50 and the elastic unit 60, which cooperate with each other to achieve an NO mode of the switch device. In the drawings, the second member 57 of the movable contact arm 52 (and/or the elastic unit 60) is 180-degree turned.

In this embodiment, the first section 41 of the rest section 40 is formed with a first mouth section 46 (in a position near the base section 43). The fixed contact 51*a* of the fixed contact arm 51 can extend through the first mouth section 46 into the space 13 of the rest section 40 or the stand 12.

In a preferred embodiment, the fixed contact arm 51 is formed with a bent finger section 51*b*, which is inserted in an insertion hole 48 of the base section 43 of the rest section 40 to help in assembling the fixed contact arm 51 with the rest section 40 or securing the fixed contact arm 51 to the rest section 40.

FIGS. 6 and 7 show that the second section 42 is formed with a second mouth section 47 (in a position near the base section 43). After the second member 57 of the movable contact arm 52 is 180-degree turned, the free section 54 (and/or at least a part of the bent section 55) and the movable contact 52*a* can extend through the second mouth section 47 into the space 13 of the rest section 40 or the stand 12. The movable contact 52*a* extends to a position of the fixed contact 51*a*, whereby the fixed contact 51*a* and the movable contact 52*a* are positioned in an upper position and a lower position as shown in FIG. 7 without contacting each other (or so-called NO mode).

As shown in the drawings, after the second member 57 is 180-degree turned, the subsidiary connection section 59 of the second member 57 is directed to the outer side of the stand 12 (or FIG. 7) can hold and assemble with the connection section 58 of the first member 56. Accordingly, the arrangement form of the second member 57 is variable to achieve the aforesaid NO mode of the switch device.

FIG. 7 shows that the bent section 55 of the movable contact arm 52 is downward convex (in a direction to the lower side of the drawing). Also, the elastic unit 60 is 180-degree turned, whereby the fixed section 61 (and/or the indentation 69) is securely assembled on the upper protrusion section 21 (and/or the retaining section 23) of the operation body 20. In this case, the subsidiary bent section 65 (or the bow section 64) of the elastic unit 60 is directed to the free section 54 of the movable contact arm 52.

As shown in the drawings, the lower protrusion section 22 of the operation body 20 pushes and presses the free section 54 of the movable contact arm to ensure that the movable contact 52*a* of the free section 54 separates from the fixed contact 51*a* (without contacting the fixed contact 51*a*).

Figure 8:
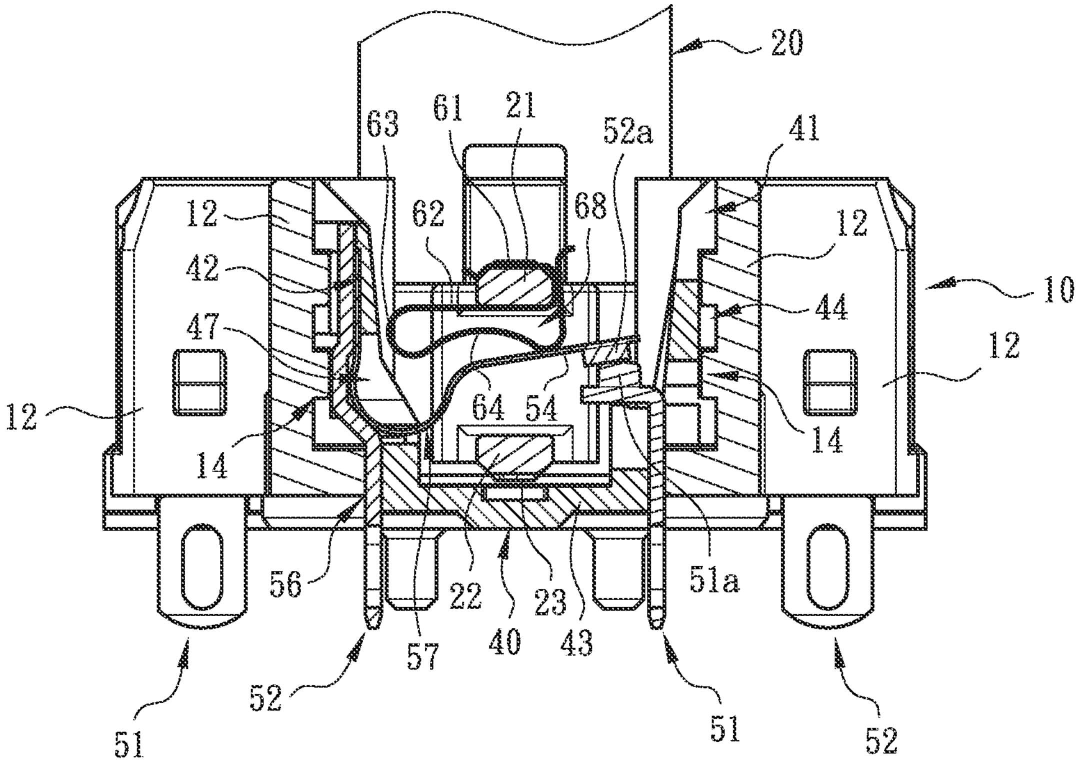
FIG. 8 is a plane view according to FIG. 7, showing that the operation body is operated to move toward the lower side.

Please refer to FIG. 8. When an operator presses down the operation button 30, the operation body 20 (and/or the upper protrusion section 21) is driven to drive the elastic unit 60 to move toward the lower side of the drawing. The upper protrusion section 21 serves as a support point for the elastic unit 60 (or the fixed section 61 or the base section 62) and the subsidiary bent section 65 pushes and presses the movable contact 52*a* into contact with the fixed contact 51*a*, whereby the switch device is situated in an NC mode. Also, the elastic unit (and/or the free section 66) is displaced in a direction to the upper side of the drawing, whereby the elastic unit 60 is situated in an energy storage state.

To speak representatively, in the condition that the structure is simplified and the operation is facilitated, in comparison with the conventional switch device, the switch device structure of the present invention has the following advantages:

1. The main body 10, the operation body 20, the electrical connection module 50, the elastic unit 60 (and/or the rest section 40) and the relevant cooperative structures have been redesigned. For example, the main body 10 has a base body 11, stands 12 and spaces 13. The rest section 40 has a first section 41 and a second section 42 and a base section 43 in adaptation to the stands 12 for assembling with the electrical connection module 50. The first member 56 of the electrical connection module 50 is formed with a connection section 58 assembled with a subsidiary connection section 59 of the second member 57, which is directed to outer side. The elastic unit 60 includes a fixed section 61, a base section 62, a bent section 63, a bow section 64, a subsidiary bent section 65 and a free section 66, which together define a geometrical configuration with a confined space 68. Obviously, the use and operation form of the switch device structure of the present invention are different from the conventional switch device.
2. The elastic unit 60 has a structural form, which is displaceable to store energy or release energy. This obviously improves the shortcomings of the conventional switch device that in the case of long-term (or highly frequent) use or due to human factors (such as in the conditions of improper operation, failure of the equipment, etc., when an operator urgently cuts off the power or open the circuit, the operator is apt to instinctively increase the application force), the switch device is easy to damage or material fatigue of the switch device is apt to take place to shorten the lifetime of the switch device.
3. Especially, the movable contact arm 52 is formed with a subsidiary connection section 59 directed to outer side. The subsidiary connection section 59 is assembled with the connection section 58 of the first member 56. The elastic unit 60 has a geometrical configuration with a confined space 68. Therefore, it is only necessary to 180-degree turn the second member 57 and/or the elastic unit 60 for achieving the specification of the switch device with NO mode and/or NC mode. This obviously improves the shortcoming of the conventional switch device that the movable contact arm of the electrical connection module must have different structural forms in adaptation to the NO mode and/or NC mode of the conventional switch device. This will increase the manufacturing cost and assembling trouble. Also, the movable contact arms with single same structure cannot be mounted to achieve the NO and/or NC circuit at the same time.

In conclusion, the switch device structure of the present invention is effective and different from the conventional switch device in space form. The switch device structure of the present invention is inventive, greatly advanced and advantageous over the conventional switch device.

The above embodiments are only used to illustrate the present invention, not intended to limit the scope thereof. Many modifications of the above embodiments can be made without departing from the spirit of the present invention.

What is claimed is:

1. A switch device structure comprising a main body (10) and an operation body (20) displaceable relative to the main body (10), at least one electrical connection module (50) being mounted on the main body (10) and at least one elastic unit (60) being mounted on the operation body (20) to be displaceable in correspondence with the operation body (20) relative to the main body (10), each electrical connection module (50) including a fixed contact arm (51) formed with a fixed contact (51*a*) and a movable contact arm (52) formed with a movable contact (52*a*), each elastic unit (60) including a fixed section (61), a free section (66), and an intermediate section connected between the fixed section (61) and the free section (66), and the fixed section (61), the free section (66), and the intermediate section, defining together a geometrical configuration, the intermediate section of the elastic unit (60) including a base section (62), whereby an indentation (69) is defined between the fixed section (61) and the base section (62), and responsive to a position of the operation body (20) relative to the main body (10), the elastic unit (60) providing a releasable elastic push force to one of push the movable contact (52*a*) of the movable contact arm (52) of the electrical connection module (50) into contiguous contact with the fixed contact (51*a*) of the fixed contact arm (51) to change a circuit state thereof from a circuit open state to a circuit closed state, or make the elastic unit (60) separate from the movable contact arm (52) to a change the circuit state thereof from the circuit closed state to the circuit open state, wherein in the circuit closed state, the elastic unit (60) is in contiguous contact with the movable contact arm (52), and wherein in the circuit open state, the elastic unit (60) is displaced from the movable contact arm (52).

2. The switch device structure as claimed in claim 1, wherein the fixed section (61) of the elastic unit (60) is fixed on the operation body (20), and the intermediate section of the elastic unit (60) including a bent section 63, a bow section 64, and a subsidiary bent section 65, the base section (62) windingly extending from the fixed section (61), the bent section (63) connected with the base section (62), and the bow section (64) connected with the bent section (63), a tail end of the bow section (64) being formed with the subsidiary bent section (65), and the free section (66) connected with the subsidiary bent section (65), the free section (66) extending in a direction to the fixed section (61), whereby when the elastic unit (60) moves in response to the operation body (20), the elastic unit (60) is displaced and moved.

3. The switch device structure as claimed in claim 2, wherein the fixed section (61) of the elastic unit (60) is bent upward and is transversely extended to form the base section (62), the base section (62) being upward bent to form the bent section (63), the bent section (63) transversely extending to form the bow section (64), the bow section (64) being formed as a concaved bow structure, a tail end of the bow section (64) being bent to form the subsidiary bent section (65), the subsidiary bent section (65) being formed as a convex structure and extending towards the fixed section (61) to form the free section (66), a length of the free section (66) passing through a horizontal position portion of the base section (62) to together form a confined space (68).

4. The switch device structure as claimed in claim 1, wherein the main body (10) has a protruding base body (11) and multiple stands (12) positioned around the base body (11) for assembling with at least one rest section (40) and the at least one electrical connection module (50), the multiple stands (12) of the main body (10) defining therebetween a space (13), locating sections (14) being disposed on each of the multiple stands (12) in the form of raised and recessed structures for mounting the rest section (40) and the electrical connection module (50), the operation body (20) being formed as a shaft-shaped body structure and being fitted on the base body (11), the operation body (20) being reciprocally moveable relative to the base body (11), upper protrusion sections (21) and lower protrusion sections (22) being disposed on the operation body (20), each of the upper protrusion sections (21) and each of the lower protrusion sections (22) perpendicularly protruding from the shaft-shaped body structure of the operation body (20), at least one of the upper protrusion sections (21) or the lower protrusion sections (22) being formed with retaining sections (23), each of the retaining sections (23) being formed as a recessed structure for assembling with the fixed section (61) of the elastic unit (60).

5. The switch device structure as claimed in claim 2, wherein the main body (10) has a protruding base body (11) and multiple stands (12) positioned around the base body (11) for assembling with at least one rest section (40) and the at least one electrical connection module (50), the multiple stands (12) of the main body (10) defining therebetween a space (13), locating sections (14) being disposed on each of the multiple stands (12) in the form of raised and recessed structures for mounting the rest section (40) and the electrical connection module (50), the operation body (20) being formed as a shaft-shaped body structure and being fitted on the base body (11), the operation body (20) being reciprocally moveable relative to the base body (11), upper protrusion sections (21) and lower protrusion sections (22) being disposed on the operation body (20), each of the upper protrusion sections (21) and each of the lower protrusion sections (22) perpendicularly protruding from the shaft-shaped body structure of the operation body (20), at least one of the upper protrusion sections (21) or the lower protrusion sections (22) being formed with retaining sections (23), each of the retaining sections (23) being formed as a recessed structure for assembling with the fixed section (61) of the elastic unit (60).

6. The switch device structure as claimed in claim 3, wherein the main body (10) has a protruding base body (11) and multiple stands (12) positioned around the base body (11) for assembling with at least one rest section (40) and the at least one electrical connection module (50), the multiple stands (12) of the main body (10) defining therebetween a space (13), locating sections (14) being disposed on each of the multiple stands (12) in the form of raised and recessed structures for mounting the rest section (40) and the electrical connection module (50), the operation body (20) being formed as a shaft-shaped body structure and being fitted on the base body (11), the operation body (20) being reciprocally moveable relative to the base body (11), upper protrusion sections (21) and lower protrusion sections (22) being disposed on the operation body (20), each of the upper protrusion sections (21) and each of the lower protrusion sections (22) perpendicularly protruding from the shaft-shaped body structure of the operation body (20), at least one of the upper protrusion sections (21) or the lower protrusion sections (22) being formed with retaining sections (23), each of the retaining sections (23) being formed as a recessed structure for assembling with the fixed section (61) of the elastic unit (60).

7. The switch device structure as claimed in claim 4, wherein the at least one rest section (40) is formed as a U-shaped structure having a first section (41), a second section (42), and a base section (43) connected between the first and second sections (41, 42), the first and second sections (41, 42) being, respectively, formed with subsidiary locating sections (44) formed as raised and recessed structures, and notches (45) positioned respectively, at a head end of the first section (41) and a head end of the second section (42), each of the subsidiary locating sections (44) of the at least one rest section (40) being assembled with a corresponding one of the locating sections (14) of the multiple stands (12) to thereby securely mount the at least one electrical connection module (50) onto a corresponding one of the at least one rest section (40).

8. The switch device structure as claimed in claim 5, wherein the at least one rest section (40) is formed as a U-shaped structure having a first section (41), a second section (42), and a base section (43) connected between the first and second sections (41, 42), the first and second sections (41, 42) being, respectively, formed with subsidiary locating sections (44) formed as raised and recessed structures, and notches (45) positioned respectively, at a head end of the first section (41) and a head end of the second section (42), each of the subsidiary locating sections (44) of the at least one rest section (40) being assembled with a corresponding one of the locating sections (14) of the multiple stands (12) to thereby securely mount the at least one electrical connection module (50) onto a corresponding one of the at least one rest section (40).

9. The switch device structure as claimed in claim 6, wherein the at least one rest section (40) is formed as a U-shaped structure having a first section (41), a second section (42), and a base section (43) connected between the first and second sections (41, 42), the first and second sections (41, 42) being, respectively, formed with subsidiary locating sections (44) formed as raised and recessed structures, and notches (45) positioned respectively, at a head end of the first section (41) and a head end of the second section (42), each of the subsidiary locating sections (44) of the at least one rest section (40) being assembled with a corresponding one of the locating sections (14) of the multiple stands (12) to thereby securely mount the at least one electrical connection module (50) onto a corresponding one of the at least one rest section (40).

10. The switch device structure as claimed in claim 1, wherein the movable contact arm (52) is a two-piece structure including a first member (56) and a second member (57), the first member (56) having a head section formed with a connection section (58), the second member (57) having a free section (54) and the movable contact (52*a*) being disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

11. The switch device structure as claimed in claim 2, wherein the movable contact arm (52) is a two-piece structure including a first member (56) and a second member (57), the first member (56) having a head section formed with a connection section (58), the second member (57) having a free section (54) and the movable contact (52*a*) being disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

12. The switch device structure as claimed in claim 3, wherein the movable contact arm (52) is a two-piece structure including a first member (56) and a second member (57), the first member (56) having a head section formed with a connection section (58), the second member (57) having a free section (54) and the movable contact (52*a*) being disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of 180 degree the subsidiary connection section (59) with the connection section (58).

13. The switch device structure as claimed in claim 4, wherein the movable contact arm (52) is a two-piece structure including a first member (56) and a second member (57), the first member (56) having a head section formed with a connection section (58), the second member (57) having a free section (54) and the movable contact (52*a*) being disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

14. The switch device structure as claimed in claim 5, wherein the movable contact arm (52) is a two-piece structure including a first member (56) and a second member (57), the first member (56) having a head section formed with a connection section (58), the second member (57) having a free section (54) and the movable contact (52*a*) being disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

15. The switch device structure as claimed in claim 6, wherein the movable contact arm (52) is a two-piece structure including a first member (56) and a second member (57), the first member (56) having a head section formed with a connection section (58), the second member (57) having a free section (54) and the movable contact (52*a*) being disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

16. The switch device structure as claimed in claim 7, wherein the movable contact arm (52) is a two-piece structure including a first member (56) and a second member (57), the first member (56) having a head section formed with a connection section (58), the second member (57) having a free section (54) and a movable contact (52*a*) disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58), the fixed contact arm (51) either being mounted on the first section (41) or being mounted in a position between the stand (12) and the first section (41), the movable contact arm (52) is either assembled with the second section (42) or is assembled in a position between the stand (12) and the second section (42), the fixed contact (51*a*) of the fixed contact arm (51) extending through the notch (45) of the first section (41) into the space (13) of the stand (12), the free section (54) and the movable contact (52*a*) of the movable contact arm (52) passing over the notch (45) of the second section (42) into the space (13) of the stand (12), the movable contact (52*a*) extending to the position of the fixed contact (51*a*), whereby the fixed contact (51*a*) and the movable contact (52*a*) are positioned in either one of an upper position and a lower position, respectively, or a lower position and an upper position, respectively, relative to one another.

17. The switch device structure as claimed in claim 8, wherein the movable contact arm (52) is a two-piece structure including a first member (56) and a second member (57), the first member (56) having a head section formed with a connection section (58), the second member (57) having a free section (54) and a movable contact (52*a*) disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58), the fixed contact arm (51) either being mounted on the first section (41) or being mounted in a position between the stand (12) and the first section (41), the movable contact arm (52) is either assembled with the second section (42) or is assembled in a position between the stand (12) and the second section (42), the fixed contact (51*a*) of the fixed contact arm (51) extending through the notch (45) of the first section (41) into the space (13) of the stand (12), the free section (54) and the movable contact (52*a*) of the movable contact arm (52) passing over the notch (45) of the second section (42) into the space (13) of the stand (12), the movable contact (52*a*) extending to the position of the fixed contact (51*a*), whereby the fixed contact (51*a*) and the movable contact (52*a*) are positioned in either one of an upper position and a lower position, respectively, or a lower position and an upper position, respectively, relative to one another.

18. The switch device structure as claimed in claim 9, wherein the movable contact arm (52) is a two-piece structure including a first member (56) and a second member (57), the first member (56) having a head section formed with a connection section (58), the second member (57) having a free section (54) and a movable contact (52*a*) disposed on the free section (54), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58), the fixed contact arm (51) either being mounted on the first section (41) or being mounted in a position between the stand (12) and the first section (41), the movable contact arm (52) is either assembled with the second section (42) or is assembled in a position between the stand (12) and the second section (42), the fixed contact (51*a*) of the fixed contact arm (51) extending through the notch (45) of the first section (41) into the space (13) of the stand (12), the free section (54) and the movable contact (52*a*) of the movable contact arm (52) passing over the notch (45) of the second section (42) into the space (13) of the stand (12), the movable contact (52*a*) extending to the position of the fixed contact (51*a*), whereby the fixed contact (51*a*) and the movable contact (52*a*) are positioned in either one of an upper position and a lower position, respectively, or a lower position and an upper position, respectively, relative to one another.

19. The switch device structure as claimed in claim 2, wherein the movable contact arm (52) is formed with a bent section (55), the bent section (55) being upward convex, the indentation (69) of the fixed section (61) of the elastic unit (60) being assembled on at least one retaining section (23) of at least one lower protrusion section (22) of the operation body (20), whereby the subsidiary bent section (65) and the bow section (64) of the elastic unit (60) are positioned towards a free section (54) of the movable contact arm (52), the lower protrusion section (22) supporting the elastic unit (60) to remain mounted to the operation body, whereby the subsidiary bent section (65) pushes and presses the movable contact (52*a*) into contact with the fixed contact (51*a*) and the elastic unit (60) is thereby displaced in a downward direction, whereby the elastic unit (60) responsively stores a resilient bias force, and subsequent to the operation body (20) driving the elastic unit (60) to move downward, the elastic unit (60) releases the stored resilient bias force.

20. The switch device structure as claimed in claim 3, wherein the movable contact arm (52) is formed with a bent section (55), the bent section (55) being upward convex, the indentation (69) of the fixed section (61) of the elastic unit (60) being assembled on at least one retaining section (23) of at least one lower protrusion section (22) of the operation body (20), whereby the subsidiary bent section (65) and the bow section (64) of the elastic unit (60) are positioned towards a free section (54) of the movable contact arm (52), the lower protrusion section (22) supporting the elastic unit (60) to remain mounted to the operation body, whereby the subsidiary bent section (65) pushes and presses the movable contact (52*a*) into contact with the fixed contact (51*a*) and the elastic unit (60) is thereby displaced in a downward direction, whereby the elastic unit (60) responsively stores a resilient bias force, and subsequent to the operation body (20) driving the elastic unit (60) to move downward, the elastic unit (60) releases the stored resilient bias force.

21. The switch device structure as claimed in claim 19, wherein the main body (10) has a protruding base body (11) and multiple stands (12) positioned around the base body (11) for assembling with at least one rest section (40) and the at least one electrical connection module (50), the multiple stands (12) of the main body (10) defining therebetween a space (13), locating sections (14) being disposed on the stands (12) and formed as raised and recessed structures for mounting the at least one rest section (40) and the at least one electrical connection module (50), the operation body (20) being formed as a shaft-shaped body structure and being fitted on the base body (11), the operation body (20) being reciprocally moveable on the base body (11), upper protrusion sections (21) and the at least one lower protrusion section (22) being disposed on the operation body (20) and each of the upper and lower protrusion sections (21 and 22) perpendicularly protruding from the shaft-shaped body structure of the operation body (20), at least one of the upper protrusion sections (21) or the lower protrusion sections (22) being formed with the at least one retaining section (23) formed as a recessed structure for assembling with the fixed section (61) of the elastic unit (60), after the operation body (20) drives the elastic unit (60) to move downward, the upper protrusion section (21) of the operation body (20) supporting the elastic unit (60) to remain mounted to the operation body (20) and the free section (54) of the movable contact arm (52) being pushed and pressed by the subsidiary bent section (65).

22. The switch device structure as claimed in claim 20, wherein the main body (10) has a protruding base body (11) and multiple stands (12) positioned around the base body (11) for assembling with at least one rest section (40) and the at least one electrical connection module (50), the multiple stands (12) of the main body (10) defining therebetween a space (13), locating sections (14) being disposed on the stands (12) and formed as raised and recessed structures for mounting the at least one rest section (40) and the at least one electrical connection module (50), the operation body (20) being formed as a shaft-shaped body structure and being fitted on the base body (11), the operation body (20) being reciprocally moveable on the base body (11), upper protrusion sections (21) and the at least one lower protrusion section (22) being disposed on the operation body (20) and each of the upper and lower protrusion sections (21 and 22) perpendicularly protruding from the shaft-shaped body structure of the operation body (20), at least one of the upper protrusion sections (21) or the lower protrusion sections (22) being formed with the at least one retaining section (23) formed as a recessed structure for assembling with the fixed section (61) of the elastic unit (60), after the operation body (20) drives the elastic unit (60) to move downward, the upper protrusion section (21) of the operation body (20) supporting the elastic unit (60) to remain mounted to the operation body (20) and the free section (54) of the movable contact arm (52) being pushed and pressed by the subsidiary bent section (65).

23. The switch device structure as claimed in claim 21, wherein the at least one rest section (40) is formed as a U-shaped structure having a first section (41), a second section (42), and a base section (43) connected between the first and second sections (41, 42), the first and second sections (41, 42) being respectively formed with subsidiary locating sections (44) formed as raised and recessed structures and notches (45) positioned at a head end of the first section (41) and at a head end of the second section (42), the subsidiary locating sections (44) of the at least one rest section (40) being assembled with the locating sections (14) of the stands (12) to thereby mount the at least one electrical connection module (50) on the at least one rest section (40).

24. The switch device structure as claimed in claim 22, wherein the at least one rest section (40) is formed as a U-shaped structure having a first section (41), a second section (42), and a base section (43) connected between the first and second sections (41, 42), the first and second sections (41, 42) being respectively formed with subsidiary locating sections (44) formed as raised and recessed structures and notches (45) positioned at a head end of the first section (41) and at a head end of the second section (42), the subsidiary locating sections (44) of the at least one rest section (40) being assembled with the locating sections (14) of the stands (12) to thereby mount the at least one electrical connection module (50) on the at least one rest section (40).

25. The switch device structure as claimed in claim 19, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with the bent section (55), the bent section (55) being connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

26. The switch device structure as claimed in claim 20, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with the bent section (55), the bent section (55) being connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

27. The switch device structure as claimed in claim 21, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with the bent section (55), the bent section (55) being connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

28. The switch device structure as claimed in claim 22, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with the bent section (55), the bent section (55) being connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

29. The switch device structure as claimed in claim 23, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with the bent section (55), the bent section (55) being connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

30. The switch device structure as claimed in claim 24, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with the bent section (55), the bent section (55) being connected with the free section (54), the second member (57) further having a base section (53) connected with the bent section (55), the base section (53) being formed with a subsidiary connection section (59) directed to an outer side, the subsidiary connection section (59) holding and being assembled with the connection section (58) of the first member (56), or the second member (57) being 180 degree rotatable for assembly of the subsidiary connection section (59) with the connection section (58).

31. The switch device structure as claimed in claim 2, wherein the movable contact arm (52) is formed with a convex bent section (55) projecting in a downward direction, the elastic unit (60) being 180 degree rotatable for assembly of the indentation (69) of the fixed section (61) of the elastic unit (60) on a retaining section (23) of an upper protrusion section (22) of the operation body (20), and the subsidiary bent section (65) and the bow section (64) of the elastic unit (60) are directed towards a free section (54) of the movable contact arm (52), the movable contact (52*a*) extending to a position adjacent to the fixed contact (51*a*), whereby the fixed contact (51*a*) is positioned underneath the movable contact (52*a*).

32. The switch device structure as claimed in claim 3, wherein the movable contact arm (52) is formed with a convex bent section (55) projecting in a downward direction, the elastic unit (60) being 180 degree rotatable for assembly of the indentation (69) of the fixed section (61) of the elastic unit (60) on a retaining section (23) of an upper protrusion section (22) of the operation body (20), and the subsidiary bent section (65) and the bow section (64) of the elastic unit (60) are directed towards a free section (54) of the movable contact arm (52), the movable contact (52*a*) extending to a position adjacent to the fixed contact (51*a*), whereby the fixed contact (51*a*) is positioned underneath the movable contact (52*a*).

33. The switch device structure as claimed in claim 31, wherein the main body (10) has a protruding base body (11) and multiple stands (12) positioned around the base body (11) for assembling with at least one rest section (40) and the at least one electrical connection module (50), the multiple stands (12) of the main body (10) defining therebetween a space (13), locating sections (14) being disposed on the stands (12) and formed as raised and recessed structures for mounting the at least one rest section (40) and the at least one electrical connection module (50), the operation body (20) being formed as a shaft-shaped body structure and being fitted on the base body (11), the operation body (20) being reciprocally moveable on the base body (11), the upper protrusion sections (21) and lower protrusion sections (22) perpendicularly protrude from the shaft-shaped body structure of the operation body (20), at least one of the upper protrusion sections (21) and the lower protrusion sections (22) being formed with retaining sections (23) formed as a recessed structure for assembling with the fixed section (61) of the elastic unit (60), the lower protrusion section (22) of the operation body (20) supporting the elastic unit (60) to remain mounted to the operation body (20) and the free section (54) of the movable contact arm (52) being pushed and pressed by the subsidiary bent section (65).

34. The switch device structure as claimed in claim 32, wherein the main body (10) has a protruding base body (11) and multiple stands (12) positioned around the base body (11) for assembling with at least one rest section (40) and the at least one electrical connection module (50), the multiple stands (12) of the main body (10) defining therebetween a space (13), locating sections (14) being disposed on the stands (12) and formed as raised and recessed structures for mounting the at least one rest section (40) and the at least one electrical connection module (50), the operation body (20) being formed as a shaft-shaped body structure and being fitted on the base body (11), the operation body (20) being reciprocally moveable on the base body (11), the upper protrusion sections (21) and lower protrusion sections (22) perpendicularly protrude from the shaft-shaped body structure of the operation body (20), at least one of the upper protrusion sections (21) and the lower protrusion sections (22) being formed with retaining sections (23) formed as a recessed structure for assembling with the fixed section (61) of the elastic unit (60), the lower protrusion section (22) of the operation body (20) supporting the elastic unit (60) to remain mounted to the operation body (20) and the free section (54) of the movable contact arm (52) being pushed and pressed by the subsidiary bent section (65).

35. The switch device structure as claimed in claim 33, wherein the at least one rest section (40) is formed as a U-shaped structure having a first section (41), a second section (42), and a base section (43) connected between the first and second sections (41, 42), the first and second sections (41, 42) being respectively formed with subsidiary locating sections (44) formed as raised and recessed structures, the subsidiary locating sections (44) of the at least one rest section (40) being assembled with the locating sections (14) of the stands (12) for mounting the at least one electrical connection module (50) on the at least one rest section (40), the first section (41) of the at least one rest section (40) being formed with a first mouth section (46), and the second section (42) being formed with a second mouth section (47).

36. The switch device structure as claimed in claim 34, wherein the at least one rest section (40) is formed as a U-shaped structure having a first section (41), a second section (42), and a base section (43) connected between the first and second sections (41, 42), the first and second sections (41, 42) being respectively formed with subsidiary locating sections (44) formed as raised and recessed structures, the subsidiary locating sections (44) of the at least one rest section (40) being assembled with the locating sections (14) of the stands (12) for mounting the at least one electrical connection module (50) on the at least one rest section (40), the first section (41) of the at least one rest section (40) being formed with a first mouth section (46), and the second section (42) being formed with a second mouth section (47).

37. The switch device structure as claimed in claim 31, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the second member (57) being 180 degree rotatable for assembly of the subsidiary connection section (59) with the connection section (58).

38. The switch device structure as claimed in claim 32, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the second member (57) being 180 degree rotatable for assembly of the subsidiary connection section (59) with the connection section (58).

39. The switch device structure as claimed in claim 33, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the second member (57) being 180 degree rotatable for assembly of the subsidiary connection section (59) with the connection section (58).

40. The switch device structure as claimed in claim 34, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the second member (57) being 180 degree rotatable for assembly of the subsidiary connection section (59) with the connection section (58).

41. The switch device structure as claimed in claim 35, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the second member (57) being 180 degree rotatable for assembly of the subsidiary connection section (59) with the connection section (58), whereby the fixed contact (51*a*) of the fixed contact arm (51) is extendable through the first mouth section (46) of the at least one rest section (40) into the space (13), the fixed contact arm (51) being formed with a bent finger section (51*b*) insertable in an insertion hole (48) of the base section (43) of the at least one rest section (40), whereby the free section (54) and at least a part of the bent section (55) of the second member (57) and the movable contact (52*a*) are extendable through the second mouth section (47) into the space (13), and subsequent to the operation body (20) driving the elastic unit (60) to move downward, the upper protrusion section (21) supporting the elastic unit (60) to remain mounted to the operation body (20) and the subsidiary bent section (65) pushing and pressing the movable contact (52*a*) into contact with the fixed contact (51*a*), whereby the elastic unit (60) responsively stores a resilient bias force and is displaced upward.

42. The switch device structure as claimed in claim 36, wherein the movable contact arm (52) is a two-piece structure including a first member (56) and a second member (57), the first member (56) having a head section formed with a connection section (58), the movable contact (52*a*) being disposed on the free section (54) of the second member (57), the second member (57) of the movable contact arm (52) being formed with a bent section (55) connected with the free section (54), the second member (57) further having a base section (53) connected with the bent section (55), the base section (53) being formed with a subsidiary connection section (59) directed to an outer side, the second member (57) being 180 degree rotatable for assembly of the subsidiary connection section (59) with the connection section (58), whereby the fixed contact (51*a*) of the fixed contact arm (51) is extendable through the first mouth section (46) of the at least one rest section (40) into the space (13), the fixed contact arm (51) being formed with a bent finger section (51*b*) insertable in an insertion hole (48) of the base section (43) of the at least one rest section (40), whereby the free section (54) and at least a part of the bent section (55) of the second member (57) and the movable contact (52*a*) are extendable through the second mouth section (47) into the space (13), and subsequent to the operation body (20) driving the elastic unit (60) to move downward, the upper protrusion section (21) supporting the elastic unit (60) to remain mounted to the operation body (20) and the subsidiary bent section (65) pushing and pressing the movable contact (52*a*) into contact with the fixed contact (51*a*), whereby the elastic unit (60) responsively stores a resilient bias force and is displaced upward.

* * * * *